Figure 1:
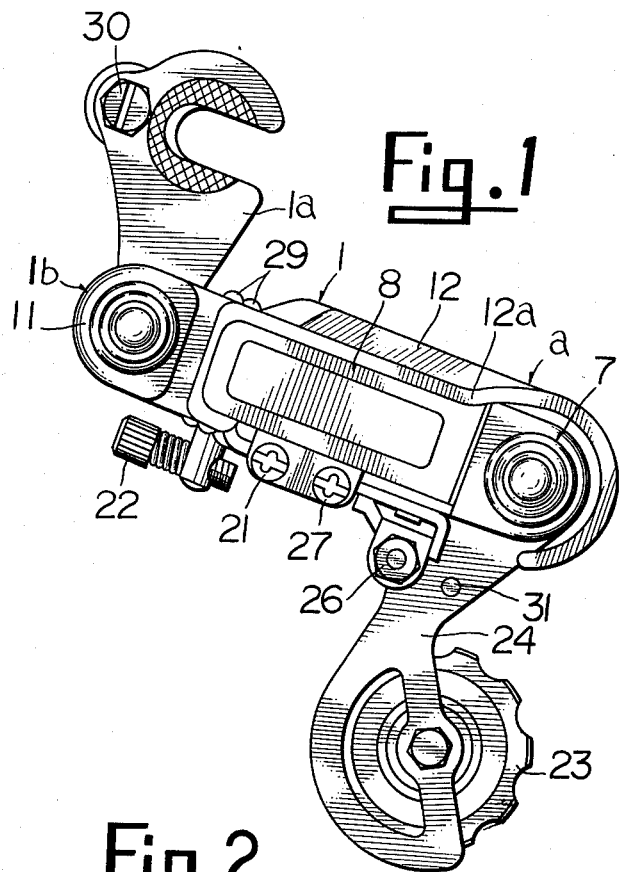

United States Patent [19]
Nagano

[11] 3,973,447
[45] Aug. 10, 1976

[54] DERAILLEUR FOR A BICYCLE

[75] Inventor: Masashi Nagano, Sakai, Japan

[73] Assignee: Shimano Industrial Company, Limited, Sakai, Japan

[22] Filed: May 28, 1975

[21] Appl. No.: 581,679

[30] Foreign Application Priority Data
June 6, 1974   Japan............................ 49-66675[U]

[52] U.S. Cl.................. 74/242.11 B; 74/242.14 B; 74/242.15 B
[51] Int. Cl.² ........................ F16H 7/12; F16H 7/10
[58] Field of Search............ 74/242.11 B, 242.15 B, 74/242.14 B

[56] References Cited
UNITED STATES PATENTS 3,847,028  11/1974  Bergles..................... 74/242.11 B X
3,896,679  7/1975   Huret et al............... 74/242.11 B X
3,903,751  9/1975   Dian......................... 74/242.11 B X

FOREIGN PATENTS OR APPLICATIONS 760,493   12/1933   France ..................... 74/242.11 B

*Primary Examiner*—Leonard H. Gerin
*Attorney, Agent, or Firm*—Stevens, Davis, Miller & Mosher

[57] ABSTRACT

A derailleur for a bicycle, having a fitting member movably supporting a support carrying chain-guide pulleys through two parallel linkage members, is provided with a guard for the support and the linkage members, which guard is formed of an extension of the fitting member directed towards the support, thereby preventing the change-speed mechanism of the derailleur from being damaged when the bicycle is overturned.

5 Claims, 4 Drawing Figures

DERAILLEUR FOR A BICYCLE

This invention relates to a derailleur for a bicycle and more particularly to a derailleur which is used together with multi-speed freewheels of a plurality of, usually three to five, differentially dented sprocket wheels attached to a rear hub of the bicycle and serves to introduce a drive-chain into selective one of the sprocket wheels.

Conventionally, this kind of derailleur comprises, as is disclosed in British Pat. Nos. 888,511 and 982,986, a fitting member for mounting the derailleur to a bicycle frame; two parallel linkage members pivoted to the fitting member; a support pivoted to the linkage members, carrying chain-guide pulleys; and a return spring urging the support only in one direction. The derailleur functions to change the bicycle speed in a manner that the support is swingingly moved against or restored with the return spring by pull of a control wire with an operating lever, so that the drive-chain may be introduced from the guide pulleys to selective one of sprocket wheels of the multi-speed freewheel. Usually the derailleur is mounted laterally of a rear wheel, coming out sidewardly of the wheel; hence, when the bicycle is overturned the derailleur at first strikes the ground resulting in damage to it. Furthermore, current bicycles have wheels of reduced diameter which place the entire bicycle lower to the ground; consequently, the derailleur often becomes subject to impact from obstacles when the bicycle is in operation.

In view of this point a derailleur provided with a guard for linkage members and movable members, has hitherto been provided so as to eliminate the aforesaid defect, which guard is formed of a separate member to be attached to one of the components, i.e., a fitting member of the derailleur.

Such construction requires more components and more trouble in assembly resulting in a high manufacturing cost. In addition, when struck by an obstacle, the guard is subject to the impact load so as to be twisted to cause damage to the fixed portion thereof or to be out of place to interrupt the linkage members in movement thereof; thus, the aforesaid problems have remained unsolved in conventional derailleurs.

This invention has been designed to eliminate the aforesaid defect.

A main object of the invention is to provide a derailleur capable of exactly protecting linkage members and a support carrying chain-guide pulleys.

Another object of the invention is to provide a derailleur having a guard for protecting linkage members and a support, which guard is prevented from being deformed or damaged at the base thereof because the fitting member bears in its entirety the impact load when the guard is struck by an obstacle.

Still another object is to provide a derailleur in which it is unnecessary to form a separate guard so that there is no increase in the number of components and the manufacturing cost is reduced.

The derailleur of the invention is characterized in that a fitting member for mounting the derailleur to a bicycle frame, is extended at the base thereof toward a support carrying chain-guide pulleys so as to form an extension which covers at the substantially middle portion thereof the upside of two parallel linkage members and at the foremost end thereof the outside of the support, whereby a guard is formed at the fitting member for guarding the linkage members and the support.

There is no need for the guard to be separately formed from other components to result in reducing the number of components. Also, since the guard is integrated with the extension of the fitting member, the impact load from the outside, such as contact with the ground, may be distributed from the guard throughout the fitting member so that the fitting member bears in its entirety the impact load. Hence, the guard can be prevented from being damaged at the base thereof and being deformed to cause interruption in movement of the linkage members as aforesaid.

Figure 2:
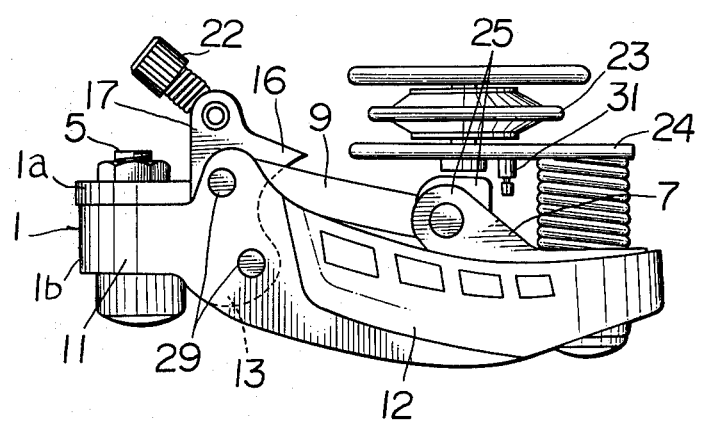
Figure 3:
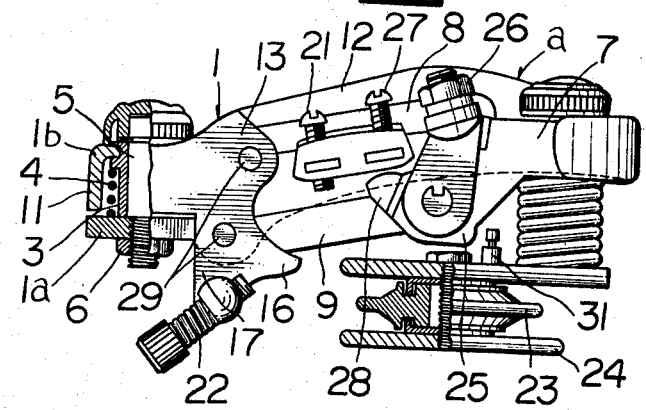
Figure 4:
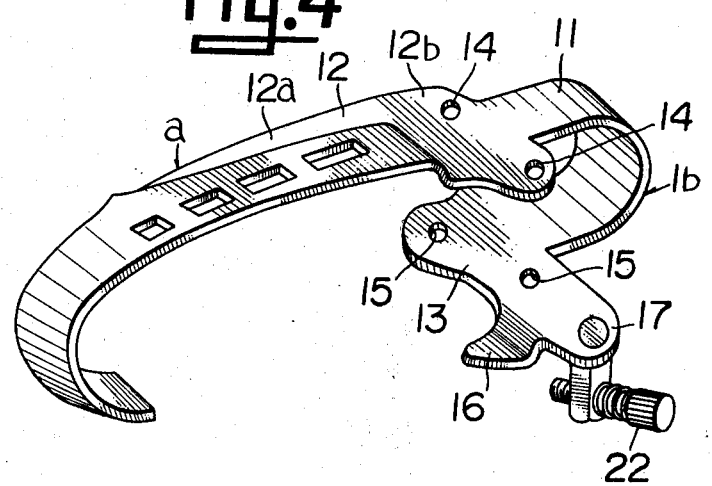

These and other objects of the invention will be understood from the following description in accordance with the accompanying drawings, in which FIG. 1 is a front view showing an embodiment of the invention, FIG. 2 is a plane view thereof, FIG. 3 is a bottom view thereof, and FIG. 4 is a perspective view of the rear of a fixing member of the invention.

A derailleur of the invention is, as shown in FIGS. 1 through 3, principally constituted of a fitting member 1, parallel linkage members including an outer linkage 8 and an inner linkage 9, and a support 7 supporting chain-guide cages 24. The fitting member 1 comprises a bracket 1a fixed to a fork end of a bicycle frame (not shown) together with a hub shaft (not shown) and a main body 1b. The main body 1b comprises a base 11 and extensions 12 and 13, as described hereinafter, extending from the base toward the support 7, and is mounted to the bracket 1a in the relation of being rotatable thereto in a given range but unmovable in the direction of the support 7 movement. The base 11 is formed in a cup-like shape, has a tubular shaft 3 chaulked to a through hole at the center of the base and a return spring 4 coiled around the tubular shaft 3, and is rotatably mounted to the bracket 1a in a manner that a spindle 5 is inserted through the tubular shaft 3 to be screwed at a threaded tip of the spindle to the bracket 1a and then tightened with a lock nut 6.

Other than the aforesaid, the fitting member 1 may be rigidly fixed to the frame or directly secured to the rear fork frame end through the main body 1b without the bracket 1a.

The main body 1b is extended in parallel from one side thereof toward the support 7 to form the upper and the lower extensions 12 and 13, which upper extension reaches the support 7 and is widthwise enlarged along the front edge thereof so that the upper extension serves as a guard covering the outside of the support 7 and the upper side of at least one linkage 8 at the front of the linkage members 8 and 9. At the root 11 of the upper extension are formed bores 14, 14 in a given space for pivoting the parallel linkage members 8 and 9 therethrough.

The lower extension 13 is made short compared with the upper extension 12, perforated with bores 15, 15 opposite to the bores 14, 14 respectively, and provided at the foremost end thereof with a stopper 16 for a low-speed-adjust bolt 21 at the outer linkage 8 and with a nose 17 for carrying thereon a retainer 22 for an outer cable.

The upper and the lower extensions 12 and 13 are opposite, in parallel and spaced slightly larger in width than each linkage member.

At the support 7 are rotatably mounted cages 24 having, as is well known, chain-guide pulleys 23, 23 and two arms 25, 25 extending in parallel toward the main body 1b of the fitting member 1, which arms pivotally support each one end of the linkage members 8, 9, and is provided with a retainer 26 for an inner wire, and a stopper 28 for a high-speed-adjust bolt 27.

The parallel linkage members 8, 9 which are pivoted at each one end thereof to the support 7, are equal in length, C-like shaped in section and opposite each other at the open side thereof. Both the members 8, 9 are inserted at each one end thereof between the extentions 12 and 13 so as to be pivotally supported therewith through pivots 29, 29 which are inserted into the bores 14, 14 and 15, 15 respectively in the relationship that both the members are rotatable around the pivots axially of the fitting member 1. Also, at the front linkage member 8, outside with respect to the bicycle frame, are mounted the aforesaid adjust bolts 21 and 27 in a freely adjustable condition.

Incidentally, in FIG. 1 the reference numeral 30 denotes a set-screw at the bracket 1a and 31 denotes a stopper at one of the cages 24.

The derailleur of the invention is used for change-speed in a manner that the bracket 1a is fixed to the foremost end of the rear frame, the outer cable is secured at a terminal thereof to the retainer 22, the inner wire is secured at a terminal thereof to the retainer 26, a control lever at a handle bar or a top tube frame is operated to pull the cable and the wire, and the linkage members 8 and 9 are moved to allow the cages 24 to be swingingly moved, so that the drive-chain on the cages 24 is engaged with a selective one of the sprocket wheels.

Since the guard a formed at the upper extension 12 is positioned outermost of the derailleur, when the bicycle is overturned, at first, the front edge of the extension strikes the ground; hence, the guard a performs the task of completely protecting the linkage members 8 and 9 and the support 7.

As is clearly understood from the abovementioned description, the invention has been so designed that the guard formed of the extension of the fitting member, is not required to be assembled separately from the linkage members or the support so that the number of components in assembly of the derailleur may be the same as a conventional one without the guard. As a result, with no increase in parts assembly is less troublesome than that of the derailleur with a separately formed guard, whereby the derailleur of the invention may be offered at moderate prices.

Furthermore, being formed integrally of the fitting member, the guard is most suitably positioned to guard the parallel linkage members and the support, also, when the guard strikes other things, the fitting member bears in its entirety the impact load applied thereon, whereby there is eliminated the defect in the separately formed guard, such as, the damage to fixed portions thereof, or the displacement of the guard causing interruption in movement of the linkage members.

While an embodiment of the invention has been shown and described, the invention is not limited to the specific construction thereof, which is merely exemplified in the specification rather than defined.

What is claimed is:

1. A derailleur for a bicycle, comprising:
    a. a fitting member for mounting on a bicycle frame;
    b. first and second parallel linkage members pivoted at one end to said fitting member and having upper surfaces, said first linkage member being locatable outwardly of the bicycle frame and said second linkage member being locatable inwardly of said first linkage member;
    c. a support carrying chain guide cages having two rotatable chain guide pulleys, said support being pivoted to the other ends of said linkage members and being rotatable with respect to said fitting member; and
    d. said fitting member including a main body and a first extension extending at one end from one side of said main body towards said support, said extension at substantially an intermediate portion thereof projecting outwardly of said first linkage member and covering at least the upper surface of said first member, said extension being curved at the other end to cover the outside of said support, whereby said extension guards said first linkage member and said support.

2. The derailleur according to claim 1 wherein said fitting member further comprises a bracket mountable on the bicycle frame, said main body being mounted on said bracket and rotatable over a given angle with respect to said bracket.

3. The derailleur according to claim 2 further comprising a second extension extending in parallel with said first extension from said main body, said first extension extending from an upper side and said second extension extending from a lower side of said main body, said second extension being shorter in length than said first extension and extending towards said support to form a stopper for restricting movement of said cages.

4. The derailleur according to claim 1 wherein said extension also covers the upper surface of said second linkage member.

5. The derailleur according to claim 1 wherein said extension is integral with said main body.

* * * * *